Sept. 29, 1970    R. SHOTTENFELD    3,531,793
BURGLAR ALARM SYSTEM
Filed June 13, 1967
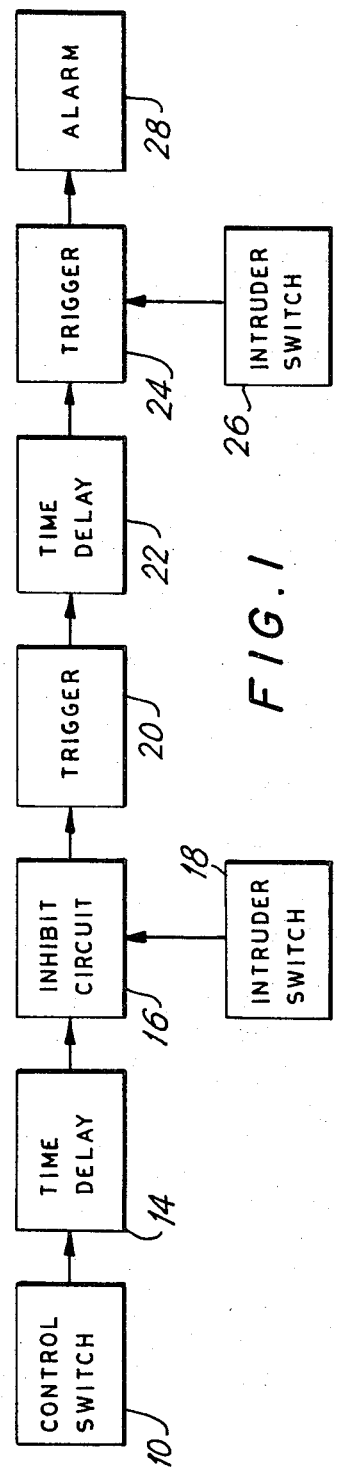
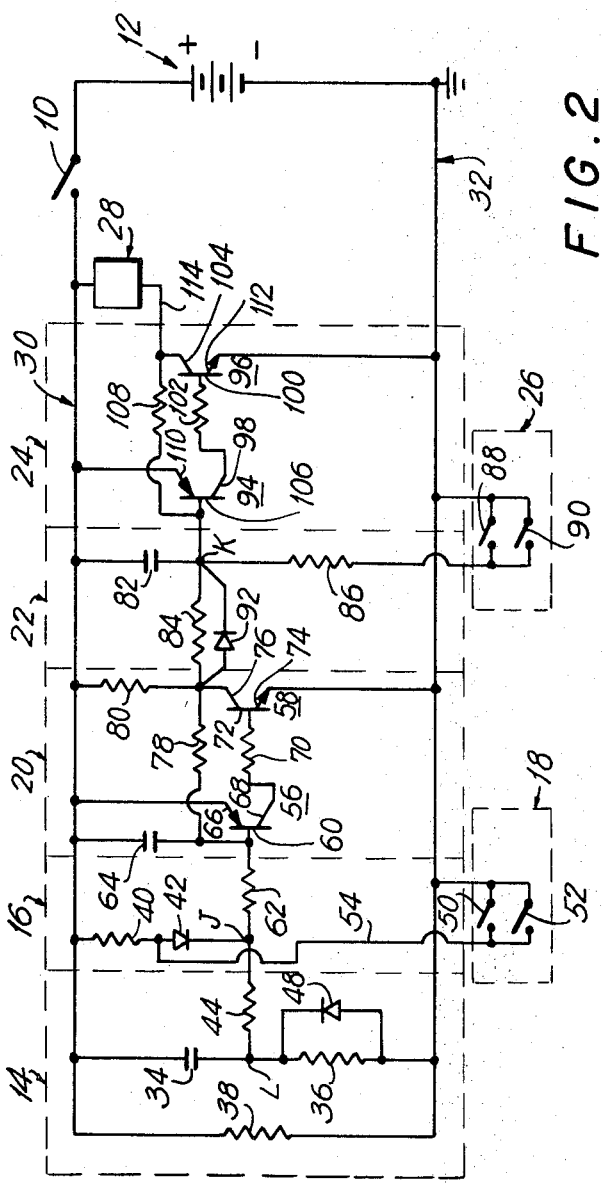
INVENTOR.
RICHARD SHOTTENFELD
BY
ATTORNEYS

United States Patent Office 3,531,793
Patented Sept. 29, 1970

3,531,793
BURGLAR ALARM SYSTEM
Richard Shottenfeld, 85—77 Chevy Chase St.,
Jamaica, N.Y. 11432
Filed June 13, 1967, Ser. No. 645,815
Int. Cl. G08b 13/08
U.S. Cl. 340—276
4 Claims

ABSTRACT OF THE DISCLOSURE

An alarm system suitable for protection of automobiles against burglary has a first intruder switch suitable for the driver's door, and a second intruder switch for the passenger doors, trunk or hood. When a control switch, which is located in the vehicle interior, energizes the system by connection thereof to the battery, a time delayed signal is applied to a first inhibit circuit controlled by the first intruder switch. The output of the first inhibit circuit is applied to a second time delay circuit whose output is applied to a trigger circuit which is controlled by the second intruder switch, with the output of the trigger circuit energizing a suitable alarm.

BACKGROUND OF THE INVENTION

This invention relates to an alarm system and more particularly to an electronic burglar alarm system suitable for the protection of automobiles, residential and commercial premises, and the like.

In presently known automobile burglar alarm systems, the doors, trunk and hood are provided with normally open contacts such that when any door, hood or trunk is opened, the contacts of the corresponding switch will close to allow current to flow in the detection circuit. In such presently used alarm systems, a relay is provided which is operative in response to the output of the detection circuit to close its relay contacts to thereby connect the alarm to the battery and hence cause the alarm to sound. In such systems, in order to allow the driver to enter and leave his automobile without sounding the alarm, a control switch is generally located on the outside of the automobile whereby the driver may turn on the system after he has left the automobile, and turn the system off before he enters the automobile. It is apparent, however, that the requirement for the outside location of the control switch in such presently known alarm systems, is a serious disadvantage since it may be easily rendered inoperable due to action of the elements, e.g. freezing due to snow or ice, and is also vulnerable to tampering. A further disadvantage in locating the control switch on the exterior of the automobile is that the switch in most instances, must be mounted in doubled walled fenders, which is a costly installation, and furthermore, cars with fiberglass bodies offer virtually no suitable place for mounting the control switch, since the fiberglass body material itself may be easily cut away to expose the interconnecting wiring and thus disable the complete system. Yet another disadvantage of presently known automobile burglar alarm systems resides in the fact that the driver must remember to operate the control switch with his key in order to make the system operational, and if he forgets to do so, the car will be left without the protection of the alarm system.

SUMMARY OF THE INVENTION

Generally speaking, and in accordance with the principles of the present invention, there is provided an alarm system for protection of enclosed premises having at least one point of entry and adapted for connection to a source of potential having a pair of output terminals. The alarm system comprises control switch means for selectively connecting the alarm system to the potential source in order to energize the alarm system. There is further provided time delay means which is operative to provide a selectively delayed output signal after energization of the alarm system, trigger circuit means, and inhibit circuit means connected to the time delay means and operative to selectively inhibit and transmit the time delay signal to the trigger circuit to produce an output trigger signal. Means for applying the trigger output signal to an alarm to energize the alarm is provided, with the control switch means being operative to deenergize the alarm.

Accordingly, it is an object of the present invention to provide an alarm system suitable for protection of enclosed premises which may be entirely controlled from within the premises.

It is a further object of the present invention to provide a burglar alarm system for protection of enclosed premises wherein one can turn on the alarm system when within the enclosed premises to thereby secure protection against holdup.

A further object of the present invention is to provide an automobile burglar alarm system having a control located within the automobile, and wherein the driver may open the driver's door, be seated, and operate the control, all before the alarm is sounded.

Still another object of the present invention is to provide an automobile burglar alarm system wherein if the driver leaves his automobile without turning on the alarm system, the alarm will sound.

Still other objects and advantages of the present invention will in part be obvious and will in part be apparent from the specification.

The invention accordingly comprises the features of construction, combinations of elements, and arrangement of parts which will be exemplified in the constructions hereinafter set forth.

BRIEF DESCRIPTION OF THE DRAWINGS

For a fuller understanding of the invention, reference is had to the following description taken in connection with the accompanying drawings, wherein:

FIG. 1 is a block diagram of an alarm system constructed in accordance with the principles of the present invention; and FIG. 2 is a schematic diagram of the preferred embodiment depicted in FIG. 1.

DESCRIPTION OF PREFERRED EMBODIMENTS

Referring to the drawings, and FIG. 1 in particular, the alarm system of the present invention is seen to comprise a control switch 10, which may suitably comprise a key operated switch located near the driver's position, which selectively connects the remainder of the system to a battery source 12. Time delay circuit 14, responsive to the closure of switch 10, is operative to provide a time delayed output signal to inhibit circuit 16. Intruder switch 18 is connected to inhibit circuit 16 and is operative to control the inhibit action of inhibit circuit 16. Thus, for example, when intruder switch 18 is closed, inhibit circuit 16 is operative to transmit the pulse signal applied thereto by time delay circuit 14 to trigger 20, and conversely, when intruder switch 18 is open inhibit circuit 16 is operative to inhibit, i.e. block the transmission, of the signal pulse applied thereto by time delay circuit 14.

Trigger circuit 20 is an amplifier circuit which produces a zero output, unless the amplitude of the input signal applied thereto by inhibit circuit 16 exceeds a preselected threshold value. If the input signal to trigger 20 exceeds the aforesaid threshold value, trigger 20 is operative to produce a full power output signal whose amplitude is independent of the input signal provided by inhibit circuit 16. Furthermore, trigger circuit 20 is operative to maintain a full power output signal, even though the input signal thereto exists only momentarily, and then is completely removed. If, however, control switch 10 is opened, even momentarily, trigger circuit 20 will revert to the zero output condition.

The output of trigger circuit 20 is applied to time delay circuit 22, which is operative to produce an output signal after a preselected time interval, after the application thereto of an input signal provided by trigger circuit 20.

Trigger circuit 24 is operative in a similar manner to that described above with respect to trigger circuit 20. However, intruder switch 26 which may be located on the passenger doors, hood, or trunk lid of the automobile, is connected to trigger circuit 24 and is operative, independently of intruder switch 18, to cause trigger 24 to produce an output signal to alarm 28, which may comprise an alarm bell or other suitable device, to ring continuously until the system is deenergized by opening control switch 10. It is thus seen, that the opening of the driver's door to cause switch 18 to close, or opening of the passenger door e.g. to cause intruder switch 26 to close, will cause trigger circuit 24 to energize alarm 28.

Referring to FIG. 2, control switch 10 is interconnected between the positive lead of battery source 12 and the positive supply buss 30, with the negative terminal of battery 12 being connected to ground buss 32. A series charging circuit, comprises charging capacitor 34 serially connected to charging resistor 36, with the end terminals of capacitor 34 and resistor 36 being connected to positive buss 30 and ground buss 32 respectively. Resistor 38 is connected between positive and negative busses 30 and 32, whose difference of potential is typically 12 volts, corresponding to a car battery voltage of 12 volts. Inhibit circuit 16 is seen to comprise a resistor 40 having one end thereof connected to buss 30 with the other end connected to the anode of diode 42. Resistor 44 interconnects junction L of capacitor 34 and resistor 36, and the cathode of diode 42. Diode 48 is connected across charging resistor 36. Intruder switch 18 comprises a plurality of single pole single throw switches in parallel arrangement such as switches 50 and 52 having one of their joint end terminals connected to ground buss 32, with the other of their end terminals jointly connected through lead 54 to the junction of resistor 40 and diode 42.

Trigger circuit 20 generally comprises a switch amplifier including transistors 56 and 58, with the output of inhibit circuit 16, at the junction of diode 42 and resistor 44, being applied to base 60 of transistor 56 by means of coupling resistor 62. As shown in FIG. 2, diode 42 has its anode connected to positive buss 30 through resistor 40 so that it will be in forward conducting state, wherein it exhibits a very low resistance with resistor 40 also having a low resistance comparable to the resistance value of diode 42 in the conducting state. Resistor 40 is operative to protect against a direct short circuit between positive and negative busses 30 and 32 respectively, when switches 50 or 52 are closed, and it is the relatively low combined resistance of resistor 40 and diode 42 that maintains the voltage of junction J very close to the potential of positive buss 30. Thus, since diode 42 is preferably a germanium type whose forward voltage drop is typically about 0.15 volt, the difference of potential between positive buss 30 and junction J is maintained at approximately 0.3 or 0.4 volt. It is the aforementioned difference of potential between positive buss 30 and junction J which provides the inhibit function of inhibit circuit 16 since the voltage at junction J cannot exceed the aforementioned value irrespective of the variation in voltage at junction L and that value is insufficient to actuate trigger circuit 20 as hereinafter explained.

The inhibit function of inhibit circuit 16 is defeated when either switch 50 or switch 52 is closed since in the event of such closure, the anode of diode 42 is directly connected to ground buss 32 by means of lead 54. In this event, the cathode of diode 42 will be positive with respect to the anode thereof i.e. reverse biasing diode 42, thereby causing diode 42 to be switched from its conductive to its nonconductive state i.e. having a very high resistance in the order of 1 megohm thereby effectively creating an open circuit between junction J and positive buss 30, and thus allowing junction J to approach the potential of junction L.

The intruder switch 18 is preferably wired so that one end terminal is common with the negative buss 32 because that is the chassis of the vehicle. The function of the intruder switch as it applies to control of the inhibit circuit could equally well be accomplished by connecting the intruder switches 50 and 52 between junction J and the base 60 omitting diode 42, resistor 40 and 62 and connecting a resistor between base 60 of transistor 56 and a positive buss. The practical disadvantage here is that the circuit has high impedance and subjects the trigger circuit to false operation due to hum and noise signals unless the circuit is well shielded.

Referring to trigger circuit 20, PNP transistor 56 is of the silicon type, in which a base to emitter voltage of about 0.6 volt is required to produce collector current flow. Recalling that the 0.3 to 0.4 volt maintained by the inhibit circuit between junction J and the positive buss 30 is more than the typical turn on voltage of a germanium transistor, but less than the typical turn on voltage of a silicon transistor, and that the voltage between junction J and the positive buss 30 is essentially the base to emitter voltage of transistor 56, it will be seen that the collector current in transistor 56 can be turned on and off by variation of the potential at junction J only if transistor 56 is of the silicon type and not of the germanium type. Trigger circuit 20 which utilizes PNP transistor 56 and NPN transistor 58 is known as a complementary switch, which possesses an important advantage over a bistable flip flop circuit for use in automobile burglar alarm systems, since, when intruder switch 18 is open, the input pulse to trigger 20 will be inhibited and both transistors 56 and 58 will be nonconductive, whereas in a bistable flip flop circuit one of the pair of the transistors will always be drawing current thereby producing a current drain on the battery.

Base 60 is connected through capacitor 64 to positive buss 30 and emitter 66 is connected directly to positive buss 30. The output of transistor 56 at its collector 68, is applied through coupling resistor 70 to base 72 of transistor 58, with emitter 74 of transistor 58 being connected directly to ground buss 32. Collector 76 of transistor 58 is connected to base 60 through coupling resistor 78 and to positive buss 30 through load resistor 80.

The voltage at base 60 will exceed its turn-on level of about 0.6 volt, to cause transistor 56 to draw current and to ultimately cause the energization of alarm 28, if control switch 10 has been in the closed position for a period of time exceeding the delay circuit 14, providing that at least one of switches 50 and 52 is closed. When the voltage at base 60 reaches the turn-on voltage for transistor 56, current will flow through collector 68 and coupling resistor 70, to base 72 of transistor 58, to thereby turn transistor 58 "on," i.e. conductive. The current thereby caused to flow through collector 76 is drawn through resistor 80, and through resistor 78 and base 60 of transistor 56, thereby causing transistor 56 to conduct more heavily. This positive feed back regenerative action between transistors 58 and 56, whereby increased conduction in one of the aforementioned transistors, in turn increases conduction in the other, produces a rapid increase in the respective collector currents until they reach the saturation values, which are limited by resistors 70 and 80 respectively.

When transistors 56 and 58 are turned "on," i.e. saturated, the "on" condition of transistors 56 and 58 i.e. the output of trigger 20, is independent of the subsequent opening of intruder switches 50 and 52, since resistor 62 has a resistance value such that it isolates junction J from base 60 of transistor 56, and no variation in the potential at junction J can reduce the base current of transistor 56 to zero. This is so because the base current through resistor 78 is many times greater than the base current through resistor 62, if any. Thus, once transistors 56 and 58 are rendered into the "on" condition, it is the base current through resistor 78, rather than the current through resistor 62 that controls the conductive state of transistors 56 and 58, i.e. the output of trigger 20.

When control switch 10 is closed to initially turn the system "on," a transient voltage might appear at base 60 of transistor 56, and so capacitor 64 is connected between positive buss 30 and base 60 to drain any such starting transient, to thereby insure that trigger 20 remains in the "off" state until suitably turned "on," as described above.

Time delay circuit 22 includes charging capacitor 82, having one end connected to positive buss 30 and the other end connected to charging resistor 84, at junction K, which has its other end connected to collector 76. Current limiting resistor 86 interconnects junction K and one end of parallel connected switches 88 and 90, of intruder switch 26, with the other end of switches 88 and 90 being jointly connected to ground buss 32. Furthermore, diode 92 is connected across charging resistor 84 to provide a discharge path for charging capacitor 82 as hereinafter explained.

When trigger 20 is in the "off" state, since transistor 58 will then be nonconductive, collector 76 will be substantially at the same potential as positive buss 30. However, when transistor 58 is driven into the saturated condition, the potential at collector 76 will drop to within a few tenths of a volt positive with respect to ground buss 32, due to the very low resistance of the emitter to collector path of transistor 58 when in the saturated condition. Capacitor 82, which was initially uncharged, will now begin to charge through charging resistor 84, and the potential of junction K will accordingly begin to drop, in a manner similar to the drop in potential at junction J with respect to the charging of capacitor 34.

Trigger circuit 24 is similar to trigger circuit 20, and comprises a pair of complementary transistors 94 and 96, with collector 98 of transistor 94 being connected to base 100 of transistor 96 by coupling resistor 102. Collector 104 of transistor 96 is connected to base 106 of transistor 94 by resistor 108, with emitters 110 and 112, of transistor 94 and 96 respectively, being respectively connected to positive buss 30 and ground buss 32.

When the voltage across capacitor 82 (which is also the base to emitter voltage of transistor 94), reaches the magnitude of the turn on voltage of transistor 94, transistor 96 will also be turned "on" causing current to flow in collector 104 of transistor 96, which is connected to alarm 28 by lead 114, to thereby energize alarm 28. Alarm 28 is chosen to have a sufficient resistance value to serve as a feed back resistor in a similar manner to that of resistor 80 in trigger circuit 20. Accordingly, when transistor 96 is rendered into the saturated condition, substantially the entire output voltage of battery 12 is applied across alarm 28, since the emitter to collector resistance of transistor 98 in the saturated condition is negligibly small. In this way, trigger circuit 24 will remain "on" until the system is deenergized by opening control switch 10.

Referring to trigger circuit 24, it is noted that capacitor 82, like capacitor 64 in trigger circuit 20, acts as a timing capacitor and also to insure that trigger circuit 24 will be in the "off" state i.e. transistors 94 and 96 will be nonconductive when the system is turned on by means of control switch 10.

Intruder switch 26, which may be physically located at the passenger doors, hood or trunk of the car, are operative to provide an instantaneous alarm upon the closure of either switch 88 or 90. When either switch 88 or 90 is closed, base 106 of transistor 94 will be connected to ground buss 32 through current limiting resistor 86, which is operative to protect transistor 94 from an excessive base current. This will cause both transistors 94 and 96 to conduct heavily and the alarm to sound continuously until interrupted by operation of control switch 10.

In order to insure that timing capacitors 34 and 82 discharge quickly, to avoid a residual charge thereon, which might otherwise cause the system to behave improperly, diodes 48 and 92 are respectively connected across charging resistors 36 and 84. Diodes 48 and 92 are in the reverse biased condition i.e. nonconductive, and are forward biased i.e. conductive, by the residual voltages across charging capacitor 34 and 82 respectively when control switch 10 is opened to deenergize the system. Thus, diodes 48 and 92 serve as switches which close when the system is deenergized, whereby they permit capacitor 34 to discharge through resistor 38, and capacitor 82 to discharge through resistor 80 to permit virtual complete discharge within approximately 0.5 second. Diodes 48 and 92 also serve as switches which are open while the system is energized. Thus, even a momentary opening of control switch 10 is sufficient to reset the complete system whereby it is ready for immediate operation.

The function of the alarm system of the present invention, as described hereinabove, will now be described in actual operation. When the driver has parked his car and wishes to depart therefrom, he will allow his passengers to depart and then, by means of a key, will close control switch 10 to thereby energize the alarm system. The driver may then promptly leave by the driver's door and lock it in the normal manner. When the driver returns to reenter the car, he may unlock the driver's door in the ordinary manner, and once inside the car, he may turn off the alarm system by opening key operated control switch 10. The driver may, if he so wishes, close control switch 10 immediately to obtain holdup protection while driving his car. Thereafter, unless control switch 10 is opened in the interim, any door opening will cause the alarm to sound.

If the system has previously been deenergized by allowing control switch 10 to remain in the "off" position, simply turning the key to place the control switch in the "on" position is all that is required. However, if the alarm system has previously been energized to provide holdup alarm protection, then the control switch must be placed in the "off" position before the passengers leave and remain in that position until all have left the vehicle. Thereafter the control switch must be returned to the "on" position before the driver leaves. Thus, the interior location of the control switch enables the driver to operate the car with the alarm "on" and he is forced to remember to use his key to defeat the alarm before he and his passengers leave. After all the passengers have left the car, and the driver has reenergized the alarm, the driver may then promptly leave by the driver's door and lock it in the usual manner.

When the system is energized by closing key operated control switch 10, after a predetermined time interval, as described above, time delay circuit 14 will provide an output signal of sufficient amplitude to operate trigger circuit 20 if applied thereto. However, the output of time delay circuit 14 is applied to the input of inhibit circuit 16, which will be operative to block the output of time delay 14, unless either of intruder switches 50 or 52 are closed, to thereby defeat the inhibiting function of inhibit circuit 16, and to allow inhibit circuit 16 to transmit the output signal of time delay circuit 14 to the input of trigger circuit 20, and thereby cause alarm 28 to become energized, as described hereinabove. However, if before the time delay provided by time delay circuit 14 has elapsed, the driver's door is opened and closed i.e. either switch 50 or 52 is closed and opened, inhibit circuit 16 will be in the inhibiting stage when the output of time delay circuit 14 reaches the amplitude necessary to render trigger circuit 20 "on" and accordingly, the alarm will not be sounded. However, if intruder switches 50 or 52 are closed after the time delay interval provided by time delay circuit 14 has elapsed, the inhibiting function of inhibit circuit 16 will be defeated by such closure of switches 50 or 52, trigger circuit 20 will be rendered "on," and alarm 28 will be energized irrespective of the subsequent opening of intruder switches 50 or 52, and alarm 28 will then be able to be disabled only by opening key operated control switch 10.

When trigger circuit 20 is triggered, as above, it applies an output pulse at collector 76 to time delay circuit 22, which in turn, after a suitable delay determined by capacitor 82 and resistor 84, provides an output pulse to trigger circuit 24 at base 106 to thereby render trigger circuit 24 "on" and hence energize alarm 28, irrespective of the condition of intruder switch 26. Thus the time delay interval provided by time delay circuit 14 corresponds to the necessary time interval required to allow the driver to exit from the car and close the driver's door after he has closed key operated control switch 10 inside the car.

As pointed out above, if either of intruder switches 88 or 90 are closed when control switch 10 is closed, alarm 28 will immediately sound, irrespective of the condition of intruder switch 18.

When the car has been standing for a time interval greater than the time delay interval provided by time delay 14, and control switch 10 has been earlier closed, when the driver's door is opened to permit the driver to reenter the car, the opening of the driver's door, i.e. closure of switch 18, will cause trigger circuit 20 to be immediately rendered "on," and, accordingly, during the subsequent time delay provided by time delay circuit 22, the driver is required to deenergize the alarm system by opening control switch 10 in order to prevent alarm 28 from sounding. Thus the time interval provided by time delay circuit 22 corresponds to the time required for the driver to enter his car and shut off the alarm system by opening control switch 10. In this connection, it is to be noted, that in virtually all cases, a burglar entering the car will not be able to defeat the alarm system of the present invention in the short time interval provided by time delay circuit 22.

While the alarm system of the present invention has been described above particularly with reference to burglar protection for an automobile, it is understood that such an alarm system may have a wide variety of applications such as burglar protection for residences as well as business establishments, since the features of delayed and instantaneous response alarm permits selective protection of a premises. Thus, for example, a business office may be protected by having intruder switches 26 installed at all openings except the front door, in order to provide instantaneous response, with the main door equipped with an intruder switch 18 to provide a selectively delayed alarm response. In this way, when control switch 10 is closed, alarm 28 will sound instantaneously when entry is attempted by any opening other than through the main door, while there will be a delayed response alarm with respect to entry through the main door. Accordingly, a receptionist or guard located near the main door may then operate a push button switch to momentarily deenergize the alarm system after the front door is closed, to allow for authorized entry without sounding the alarm. However, if the receptionist or guard is subject to an immediate holdup after the visitor has entered through the front door, the alarm will then sound with no further action on the part of the guard, since the positive act of opening control switch 10 is required in order to disable the alarm after intruder switch 18 has been closed.

What is claimed is:

1. An alarm system for the protection of enclosed premises having at least two points of entry and adapted for connection to a source of power having a pair of output terminals comprising, control switch means for selectively connecting said alarm system to said potential source to energize said alarm system; first time delay means for providing an activation signal a selected period of time after energization of said alarm system; first intruder detection means including a normally open switch adapted to close upon breach of at least a first of said points of entry; inhibit circuit means connected to said first time delay means and said first intruder detection means for selectively transmitting said activation signal only upon the activation of said first intruder detection means, said inhibit circuit means including an input terminal for application thereto of said activation signal, and a diode having its anode connected to the positive output terminal of said source of potential and its cathode connected to said input terminal, said normally open switch being connected between the negative terminal of said source of potential and the anode of said diode; first trigger circuit means connected to said inhibit circuit means for producing a first alarm signal commencing upon detection of said activation signal from said inhibit circuit means and continuing until said potential source is selectively disconnected by said control switch means; second time delay means connected to said first trigger circuit means for providing a delayed first alarm signal a selected period of time after detecting said first alarm signal from said first trigger circuit; second intruder detection means for activation upon breach of at least a second of said points of entry; second trigger circuit means connected to said second time delay circuit and said second intruder detection means for producing a second alarm signal commencing upon either detection of said delayed first alarm signal from said second time delay circuit or the activation of said second intruder detection means, and continuing until said potential source is selectively disconnected by said control switch means; and alarm means connected to said second trigger circuit means for activation in response to the detection of said second alarm signal.

2. An alarm system as recited in claim 1, wherein said first time delay means includes a capacitor and a resistor connected in series between output terminals of said source of potential through said control switch means, said capacitor being connected to the positive of said output terminals, and means connecting the point of interconnection of said resistor and capacitor to said first inhibit circuit input terminal for transmission of said activation signal therebetween.

3. An alarm system as recited in claim 1, wherein said first trigger circuit means includes a complementary switch formed by a pair of switch means normally disposed in a nonconductive state and rendered conductive upon the simultaneous closing of said normally open switch and detection of said activation signal at said first inhibit circuit input terminal.

4. An alarm system as recited in claim 3, wherein said second trigger circuit means includes a second complementary switch formed by a second pair of switch means normally disposed in a nonconductive state and rendered conductive upon either the detection of said delayed first alarm signal or the activation of said second intruder detection means.

References Cited

UNITED STATES PATENTS 3,200,393   8/1965   Worley _____ 340—276
3,422,398   1/1969   Rubin _____ 340—276 X DONALD J. YUSKO, Primary Examiner P. PALAN, Assistant Examiner U.S. Cl. X.R.

340—274